United States Patent [19]

Anderson et al.

[11] 3,918,424
[45] Nov. 11, 1975

[54] INTEGRALLY CAST QUICK HEAT INTAKE MANIFOLD

[75] Inventors: John T. Anderson, Ypsilanti; Howard A. Aula, Dearborn Heights, both of Mich.

[73] Assignee: Ford Motor Company, Dearborn, Mich.

[22] Filed: Mar. 6, 1974

[21] Appl. No.: 448,798

[52] U.S. Cl. .................... 123/122 AC; 123/122 AB
[51] Int. Cl.² ........................................ F02M 31/00
[58] Field of Search ............. 123/122 AC, 122 AB; 164/11

[56] References Cited
UNITED STATES PATENTS

| | | | |
|---|---|---|---|
| 1,458,481 | 6/1923 | Good | 123/122 AC |
| 2,066,922 | 1/1937 | Wolfard | 123/122 AB |
| 2,259,480 | 10/1941 | Morris | 123/122 AB |
| 3,717,130 | 2/1973 | Thornburgh | 123/122 AB |
| 3,717,131 | 2/1973 | Chana | 123/122 AB |
| 3,780,715 | 12/1973 | Flitz | 123/122 AC |
| 3,814,071 | 6/1974 | Buchwald | 123/122 AB |
| 3,827,416 | 8/1974 | Ader | 123/122 AC |

*Primary Examiner*—Charles J. Myhre
*Assistant Examiner*—R. H. Lazarus
*Attorney, Agent, or Firm*—Joseph W. Malleck; Keith L. Zerschling

[57] ABSTRACT

A method and resulting product is disclosed for providing a quick-heat assembly for vaporizing fuel during cold starts of an internal combustion engine and to quickly dissipate heat during engine shut-down. A sheet metal wrapping is used as a retainer for the sand core assembly defining at least one passage in the intake-exhaust manifold. The wrapping is retained or cast-in-place as part of said manifold after use of the core. The wrapping is sized and textured on one side to optimize early fuel evaporation and unique weld wire is utilized to lock the wrapping in place and promote a leak-free composite manifold.

6 Claims, 4 Drawing Figures

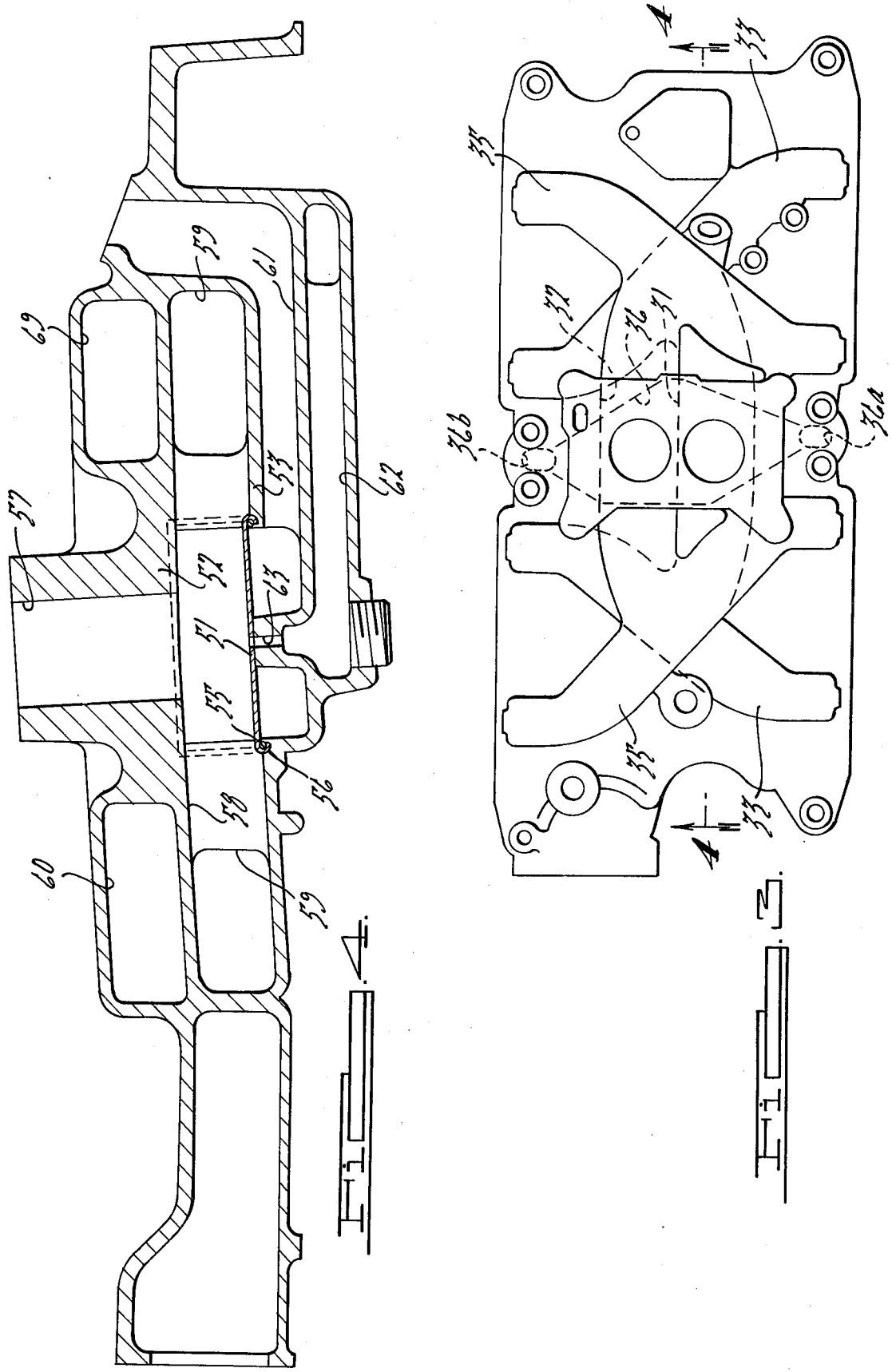

INTEGRALLY CAST QUICK HEAT INTAKE MANIFOLD

BACKGROUND OF THE INVENTION

This invention relates in general to a fuel vaporizer for an internal combustion engine and particularly to the construction and method of defining an exhaust gas crossover passage disposed adjacent the intake manifold of such engine.

Engine constructions are known in which hot exhaust gases are carried through or along the bottom wall of the intake manifold, directly beneath the carburetor throttle riser bores, to provide a so-called hot spot which is effective to vaporize any liquid fuel that may be running down the bore walls as well as fuel droplets that may be present in the carburetor air/fuel mixture. This provides more efficient cold engine starts and minimizes the choking requirements of the engine.

In the past, these constructions generally have consisted of, for example in a V-8 engine, a casting connecting two exhaust ports on opposite sides of the engine with a wide passage that passed the hot exhaust gases directly beneath the floor of the intake manifold under the carburetor throttle riser bores (see item 21, FIG. 2 of U.S. Pat. No. 1,998,636). However, since the floor of the intake manifold, like the rest of the engine, was generally of high thermal inertia cast iron, this resulted in only slow transmittal or radiation of heat from the exhaust gases to the upper surface of intake manifold wall or floor. Accordingly, it was necessary to heat essentially the entire length at the lower wall of the intake manifold in light of the high terminal inertia properties of the cast iron; heating just the hot-spot area which the fuel contacted was not enough to vaporize fuel. This, of course, resulted in the engine operating under rich mixture choking conditions for a longer period than is desirable for both engine operating efficiency and good emission control. Further, the engine tended to diesel after engine shut down resulting from the inability to quickly dispose of heat contained in the engine and which was transmitted to any lean air mixture retained in the intake system.

SUMMARY OF THE INVENTION

It is a primary object of this invention to provide an engine fuel vaporizer structure that will quickly and more efficiently provide the heat necessary to rapidly vaporize liquid fuel in the carbureted fuel/mixture inducted through the intake manifold for the engine cylinder, while at the same time, more efficiently extract such heat from the exhaust manifold while permitting the heat extraction to continue rapidly during engine shut down to prevent engine dieseling.

It is another object of this invention to provide an internal combustion engine with a leak-proof cast-in-place thin sheet metal separator or insert acting as a high heat transfer element at the exhaust gas crossover for promoting said quick heat up of the air/fuel mixture.

Yet still another object of this invention is to provide a unique method of preparing such a structure which comprises the employment of the separator as a sheet metal channel for wrapping a portion of the sand core utilized in the casting process of the engine.

Other features comprise the use of wire weld filler to provide a better cast-in-place lock, location and sizing of the liner wrapping, regulation of the metallurgical characteristic of the liner to be compatible with the cast iron metallurgy, and texturing of one side of the wrapping.

Low mass sheet metal inserts have been recently utilized to conduct the exhaust gas adjacent or through the intake manifold; many of these ideas have not yet appeared as commercial or published patent literature. These attempts to date have been deficient in various respects, some related to the cost of fabricating the insert into the engine and in other respects the desired rate of temperature rise of the heating surface in the intake manifold has not been obtained for optimum fuel evaporation after a cold start. A minimum satisfactory level of temperature rise would be at least 10°F per second at idle conditions, the latter, of course, is important during a federal standardized test. Still in other respects, the prior art inserts have not sufficiently caught and kept the fuel droplets in contact with the heating surface of the insert until vaporized; the plate temperature of the heat transfer element should have a temperature of about 400°F in order to evaporate the heavy ends of commercial gasoline.

More particularly with respect to the difficulty of attaching the low mass early evaporation plates to the manifold, the following problems have been met: inability to obtain a leak-proof type metallurgical bond between the insert and the manifold, the occurrence of frequent breakage of the heater core when the insert is clamped between the heater core and mixture core, the difficulty of cleaning finned inserts when the latter are used.

The necessity for a conventional choke fuel enrichment system, is essentially eliminated with the result that there is less emission of unburned hydrocarbons. The raw fuel flowing against the insert is vaporized and mixed with inlet air to provide the engine with a combustible charge without additional enrichment only seconds after a start.

An added advantage of the sheet metal channel insert over the conventional cast iron manifold wall is quick heat dissipation upon engine shutdown. The conventional cast iron intake manifold with a cast iron floor at the hot spot cannot act as a heat sink during engine shut down, since heat is only slowly dissipated. Hot engine re-start problems, normally encountered by too much fuel being vaporized during engine shutdown, is avoided. That is, the heat previously radiated from the crossover passage to the entire manifold radiates to the other parts of the engine up through the carburetor walls to the fuel bowl; the fuel then vaporizes and can provide too rich a mixture for engine re-start unless the present invention is utilized.

SUMMARY OF THE DRAWINGS

FIG. 3 is a plan view of the manifold structure of FIG. 2; and

FIG. 4 is a sectional view of a manifold taken along a line 4—4 of FIG. 3, but illustrating an alternative arrangement.

DETAILED DESCRIPTION

Figure 1:
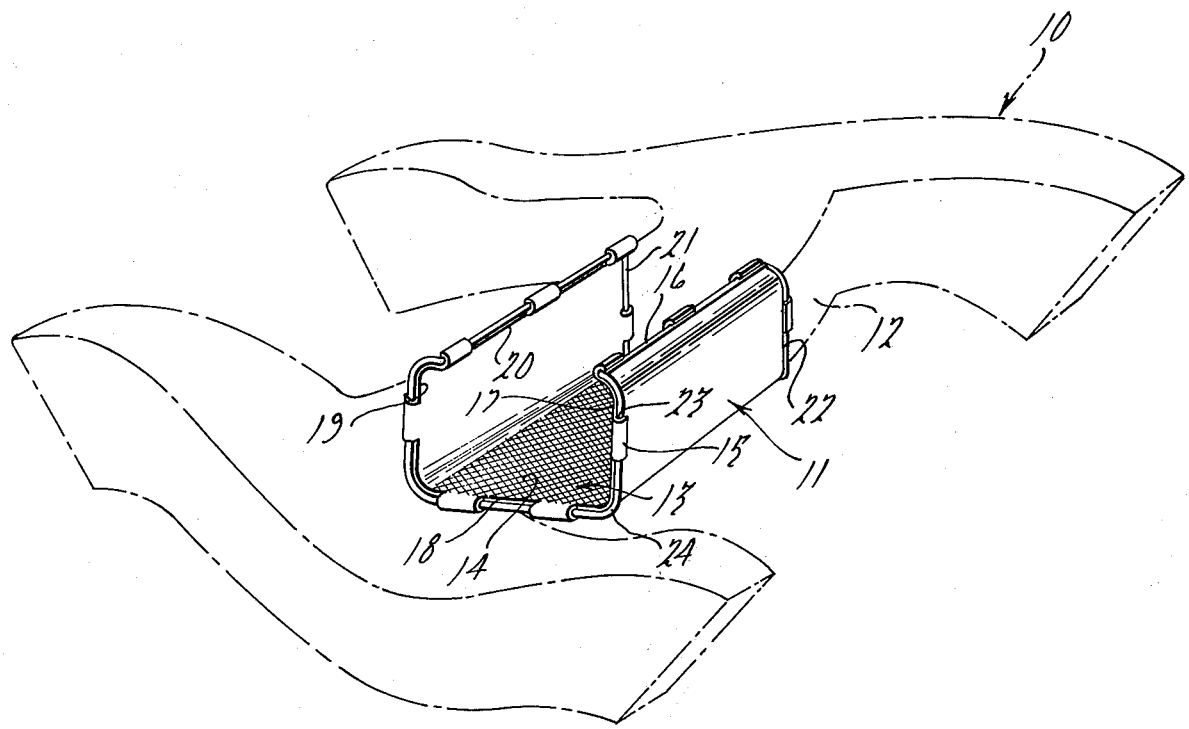
FIG. 1 is a perspective view of a sand core utilized to define certain runner passages of an intake manifold, the core having a wrapper at one location according to one of the method steps of this invention.

The invention herein is concerned with both the method of making and the resulting product of such method for an intake manifold of an internal combustion engine. The manifold is capable of providing quick heat or early fuel evaporization to reduce cold engine emissions. The emissions from the first two minutes of operating a vehicle in accordance with the 1975 federal test standards, here called cold engine emissions, contribute 37 percent of the hydrocarbons and 76 percent of the carbon monoxide of the grams per mile emissions tabulated. This is in part due to the fact that during the early portion of the test where engine emissions tend to be high, the catalytic converter is not yet hot and active. The 1975 federal test specifies a twenty second idle before the drive-away; it is highly desirable to have the choke off by the end of this twenty second idle in order to minimize carbon monoxide emissions. This is impossible with present fuels and induction systems because stumble and stalls occur that are unacceptable to the customer.

Although exhaust heated hot spots have been used in intake manifold engines for many years, they have not been refined with the object of obtaining good fuel evaporation very quickly after a start and certainly not with the standards in mind for this invention. The surface of the early fuel evaporation element in the intake manifold must have a low thermal mass and accordingly is constructed of thin sheet metal in conformity with this invention. The desired rate of temperature rise of the intake mixture is in part based upon the federal exhaust emission test where one or more heating surfaces are initially at 70°F at the start and must reach at least 270°F by the end of the 20 second idle period in order to accelerate smoothly with the choke off. Thus, a temperature rise of at least 10°F per second is required at idle conditions.

Heating of the entire air/fuel mixture in the intake manifold is undesirable for several reasons; it would absorb too much of the exhaust heat and leave little to warm the catalyst. Therefore it is important to catch the liquid fuel as it comes from the carburetor and keep it in contact with the early fuel evaporating element or surface until appropriate evaporation takes place. Some means of cathing the fuel on the element is required. The early fuel evaporation element must have a proper plate area and be in proper location relative to the riser tubes of the carburetor. Furthermore, the use of sheet metal, which is of a different metallurgical character than the cast material of the intake manifold, presents a problem of leakage due to differential thermal expansion characteristics of the different materials.

The present inventive method solves the above problems by using the sheet metal early evaporation element as a wrapper or encapsulation for the sand core typically used to define the runner passages of the manifold. That is to say, the evaporation element will be used to wrap only a portion of the sand core and will contain protuberences to insure a leakproof interlock between the wrapper and casting after the core is stripped.

A preferred method would comprise: Step 1 — preparation of a core box (not shown) having a suitable cavity to define runner passages. Step 2 — a sheet metal channel 11 is placed in one location of the core box cavity having its outer contour in snug and identical fitting relationship with the core box cavity. Step 3 — a prepared resin impregnated sand is blown into the core box cavity to form a core assembly 10. As shown in FIG. 1, only the runner passages associated with one of the risers of the carburetor is illustrated. As a separate sequence, the sheet metal channel or early-evaporation-element 11 is formed as a wrapping for the central connecting arm 12 of the core for the runner shown in FIG. 1. The sheet metal element 12 is shaped as a channel effective to substantially surround 3 sides of a portion of the central arm 12 of the sand core. The channel extends slightly around the edges of the upper surface of the core. The interior and particularly the base interior portion 13 of the evaporation element 11 is textured by a diamond pattern having specific grooves 14 therein effective to hold and gather fuel droplets so that they may be more effectively evaporated at the specific temperature experienced by the evaporation element. The evaporation element or sheet metal channel is provided with flanges 15 spaced along the edges 16, 17, 18, 19, 20, 21 and 22 thereof each of which are turned back or away from the plane of the respective wall to which it is joined, and is formed to define a journal 23. The sheet metal is preferably constituted of plain carbon steel but may be stainless steel in certain cases. A continuous strand or weld wire 24, constituted of cast iron, is strung through the internal journals of all of the flanges spaced along the peripheral edges of the wrapper. Except for the intimate contact of the interior of the journal with the weld wire strand, the strand will be slightly spaced from the edges of the channel.

Figure 2:
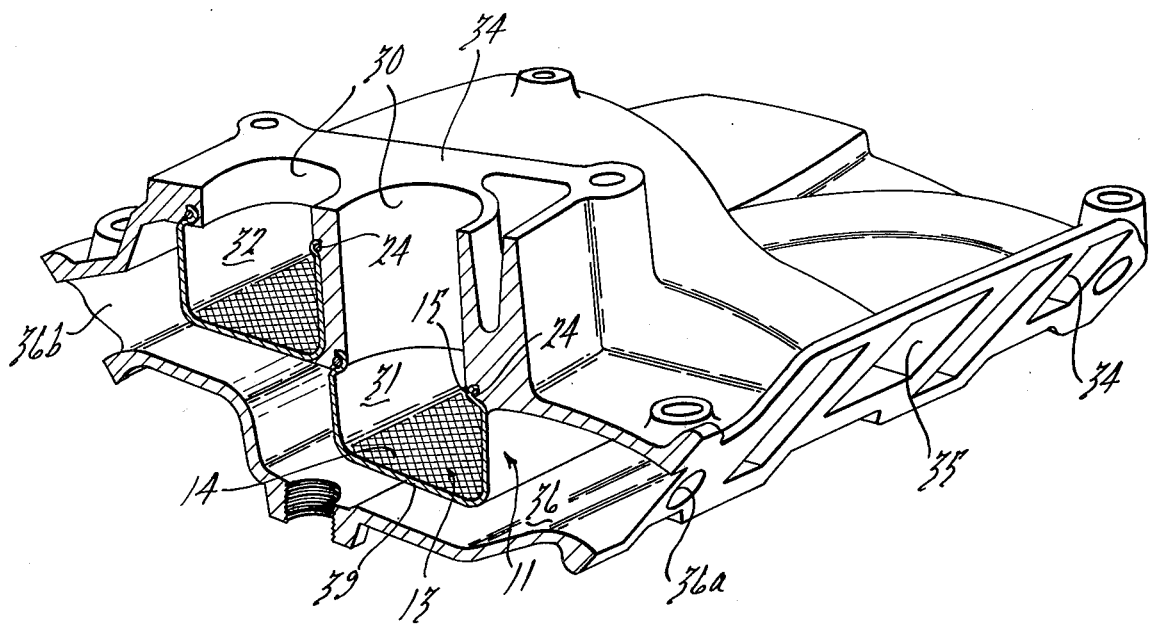
FIG. 2 is a perspective view of a cast intake manifold having the inventive early vaporizer elements in place; a portion of the manifold being broken away to illustrate said elements.

Step 4 — the assembly of the channel and sand core runners is inserted into a sand-filled flask (not shown) having a predetermined cavity for an intake manifold to be define therein. The sand core runner assemblies are placed in appropriate relationship with the cavity for defining the intake manifold such as illustrated in FIG. 2. The resulting structure will typically have at least one and preferably two riser bores 30 which communicate with a carburetor body (not shown) placed on surface 34; the carburetor has the usual air horn main body portion and throttle body, and is effective to regulate the mixture of fuel and intake air as influenced by manifold vacuum.

More particularly, the manifold consists of an arrangement having the two vertical riser bores 30 in its upper surface aligned with the carburetor induction passages. The risers direct liquid fuel in the carbureted air/fuel mixture directly down into the intake manifold passages 31 and 32 which extend transversely relative to the riser bores. Passages 31 and 32 each communicate with runner legs 33 and 35 respectively to complete a runner arrangement. The runners lead to individual cylinders of the engine block. The cross passages 31 and 32 accordingly, turn the air/fuel mixture 90° from its vertical direction to pass out opposite sides of the manifold into the respective banks of cylinder on opposite sides of the engine block.

The integrally cast intake manifold contains an exhaust gas cross over passage 36 which permits transfer of heat between exhaust gases and the air/fuel mixture entrained within passages 31 and 32. Typically the exhaust gases will pass between the exhaust manifolds (not shown) on each side of the engine and enter the cross over passage 36 at one end 36a and return at an opposite end 36b, as shown in FIG. 2. Separating the cross over passage 36 and the transverse passages 31 and 32 of the intake runner system, are the cast-in-place sheet metal vaporization elements or channels 11. In the cast condition, the sheet metal channels have their peripheral edges locked to the cast body by virtue of fusion of the cast iron weld wire 24 and the introduced molten cast iron; they become a single enity even though illustrated as discretely identifiable. The iron wire, located at the edges of the wrapper, not only provides the sealing and heat sink action required to prevent burning of the molten metal as it becomes contiguous with the sheet metal, but the wire acts much like a welding rod when contacted by the molten metal in that it provides the necessary filler to create a uniform joint between the sheet metal and iron.

With the construction shown in FIG. 2, the early fuel evaporation plate is capable of reaching 270°F at least 20 seconds after idle. The plate does not exceed 400°F before the conventional heat valve opens. Typically, the plate element will operate in the range of 250°–400°F after the heat valve has opened. The flow of exhaust gases along one side of the early evaporation element is induced to be semi-streamlined permitting a certain degree of turbulence. No deviations in the plane of the bottom surface 39 of the element is required but the opposing side is textured by grooves 14 to provide a fuel catcher function. Without such a predetermined texture, fuel flowing across the channel, in droplet form, may readily move across to the relatively cool crevices at the edges of the plate. Also critical, is the spacing between the lower edge of any riser tube extension and the evaporation element. The riser extension is a means of impinging the fuel more directly onto the evaporation plate and should be relatively closely spaced although it was found that the smooth contours of the channel, when cast in place, performed the function of a riser extension.

In FIG. 3, an alternative arrangement is illustrated with the cast-in-place quick-heat evaporator elements 50 and 51 taking the form of flat plates. Each plate is interlocked into the casting walls 52 and 53 respectively by the weld filler wire 55 (cast iron) journaled in flanges 56. The riser tube 57 communicates with transverse passage 58 defined in part by plate 51. Another riser tube (not shown) communicates with another transverse passage (not shown) defined in part by plate 50. The transverse passages communicate with runner passages 59 and 60 respectively. The cross-over exhaust passage 61 has an exhaust gas recirculation, passage 62 therebelow which communicates with the transverse passages such as by the port 63 having a wall extending upwardly through the exhaust gas cross-over passage.

We claim as our invention:

1. A method of fabricating an intake manifold for an internal combustion engine including an early evaporation element integral therein, the improvement in the method comprising:
    a. preparing a core box having a cavity in the shape of runner passages for the ultimate intake manifold,
    b. inserting an early evaporation element in the form of a sheet metal channel having peripheral protuberances spaced along the edges of said channel, said channel being placed into at least one portion of said cavity having a contour effective to nest snugly with the cavity outer contour of said channel,
    c. injecting a mixture of resin impregnated sand into said core box for forming a sand core in conformity with the cavity of said core box and the interior of said channel, curing said core assembly under heat to provide a firm structure,
    d. placing said core assembly, stripped from said core box, into a molding assembly having appropriate cavity for defining the intake manifold within a ceramic filler, pouring molten metal into said refractory cavity to form a casting about said runner passage and liner in a manner to lock with the protuberances of the channel without penetrating to the interior side of said channel which is in intimate contact with said sande core, and
    e. removing said sand coring from the solidified casting and interlocked channel.

2. The method as in claim 1, in which said sheet metal channel has protuberances formed as flanges bent outwardly from the plane of the channel walls, said flanges having a configuration to interlock with the molten iron when cast therearound, each flange forming a journal therein.

3. The method as in claim 2, in which a strand of metallurgical material similar to said casting metal, is inserted continuously through aligned journals of adjacent flanges of said channel, said strand being fused by the temperature of the molten metal to provide an improved bond between the sheet metal wrapping and the casting.

4. The method as in claim 3, in which said strand is a weld wire comprised of cast iron and said sheet metal channel is comprised of carbon steel.

5. The method as in claim 1, in which said sheet metal channel is provided with a diamond textured embossment on the inner surfaces thereof.

6. An early fuel evaporator for an internal combustion engine, said engine having an intake manifold, a carburetor mounted on the intake manifold having one or more air/fuel induction passages aligned so as to discharge an air/fuel mixture into the intake manifold, exhaust manifolding including an exhaust gas crossover passage connecting spaced parts of the exhaust manifolding and passing through the intake manifold directly beneath the carburetor induction passages, the intake and exhaust manifolding being a cast metal construction of high thermal inertia slow heat transfer material, the improvement comprising:
    a. a thin sheet metal separator disposed to fixedly separate at least one substantial portion of said intake and exhaust manifolds and act as a quick heat transfer element with low thermal inertia, said separator having all of its edges joined to said cast metal construction, said separator having protuberances extending from said edges and carrying wire weld of substantially the same composition as said cast structure said separator having an integral welded bond around its edges with said cast metal construction which results from the heat of the molten charge used to form said cast metal contruction, without the use of separate filler metal.

\* \* \* \* \*